June 4, 1940.  C. C. SMITH  2,203,000
MACHINE FOR READING PERFORATED RECORD CARDS
Filed Dec. 13, 1938  4 Sheets-Sheet 1

INVENTOR
Clarence C. Smith
BY
ATTORNEY

June 4, 1940.   C. C. SMITH   2,203,000
MACHINE FOR READING PERFORATED RECORD CARDS
Filed Dec. 13, 1938   4 Sheets-Sheet 2

INVENTOR
Clarence C. Smith
BY
W. M. Wilson
ATTORNEY

June 4, 1940.   C. C. SMITH   2,203,000
MACHINE FOR READING PERFORATED RECORD CARDS
Filed Dec. 13, 1938   4 Sheets-Sheet 3
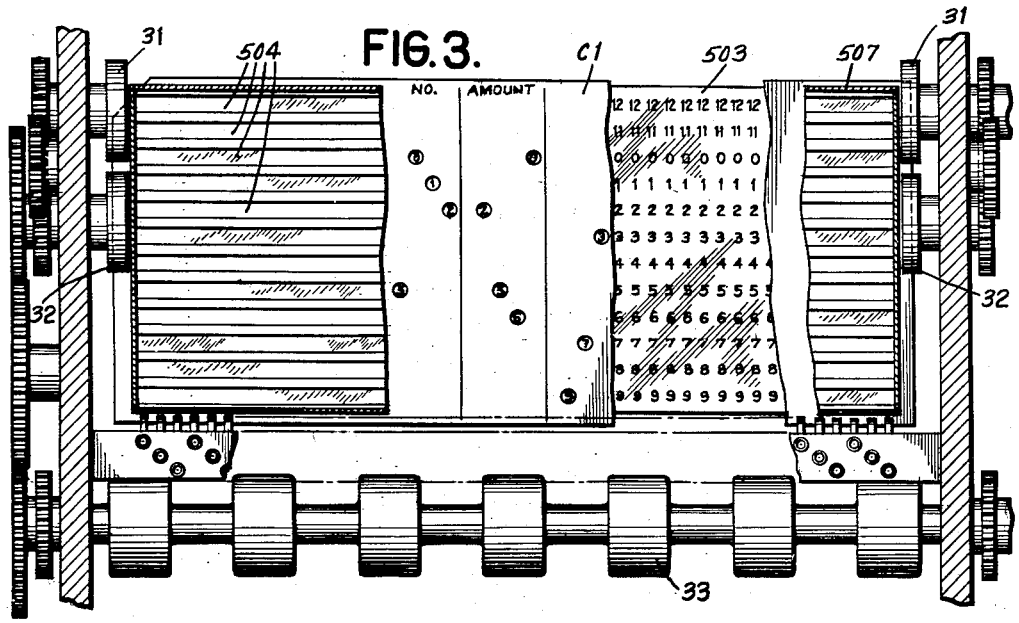
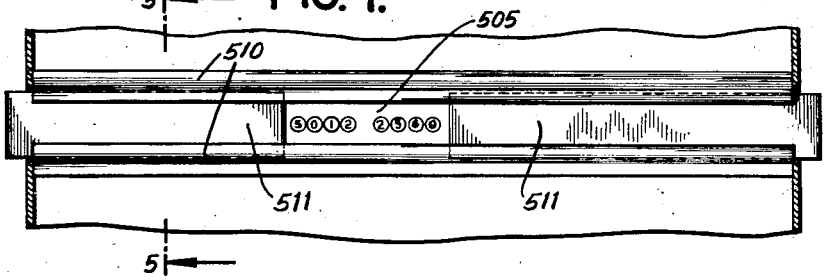
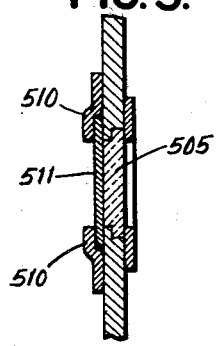
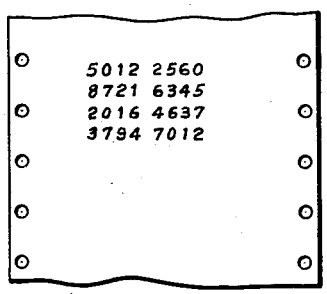
INVENTOR
Clarence C. Smith
BY W. M. Wilson
ATTORNEY June 4, 1940.　　　　　C. C. SMITH　　　　　2,203,000
MACHINE FOR READING PERFORATED RECORD CARDS
Filed Dec. 13, 1938　　　　4 Sheets-Sheet 4

INVENTOR
Clarence C. Smith
BY W. M. Wilson
ATTORNEY

Patented June 4, 1940

2,203,000

UNITED STATES PATENT OFFICE 2,203,000

MACHINE FOR READING PERFORATED RECORD CARDS

Clarence C. Smith, Flushing, N. Y., assignor to International Business Machines Corporation, New York, N. Y., a corporation of New York Application December 13, 1938, Serial No. 245,406

6 Claims. (Cl. 95—4.5)

This invention relates to record controlled accounting machines and more particularly to a device for indicating a card group before the group actually becomes effective in controlling the adding and printing mechanisms of the machine.

The type of machine with which the present invention is concerned is designed to operate under control of perforated cards from which the data represented by the perforations is entered into accumulators or printed or both. Certain card columns are ordinarily used to indicate classification data and it is customary to control the machine operation from the classification columns. Briefly, before being placed in the machine, the cards are sorted into groups of like classifications and as the cards feed through the machine, the classification perforations establish a control circuit causing the machine to continue adding and printing as long as successive cards bear the same classification data. When the classification or card group changes, meaning that two successive cards have unlike classification perforations, the control circuit of the machine is interrupted causing the machine to stop or take a total as desired.

The accounting machine is provided with a set of so-called upper or control brushes to which the cards are first fed and so-called lower or adding brushes, to which each card is fed exactly one machine cycle later. It is often desirable to know not only when a group changes but also what particular group will be added next. The first card in a group is fed past the upper brushes before the machine senses the difference between its classification data and that on the preceding card; consequently, the card which bears the first group designation of the succeeding group is already past the upper analyzing brushes before warning is given that the group is changed.

In certain cases it may be desirable to perform some operation either connected or not connected with the accounting machine for each new group. For example, it may be desired to insert a separate distinct ledger sheet for each group to receive the data from the cards of the group and, in order for the operator to insert the proper sheet, the related group number must be made known.

Indicating mechanisms for this purpose have been devised but these have been mainly of mechanical or electric mechanical construction involving the utilization of a great many parts and additional mechanism required to effect synchronization with the rest of the machine.

It is accordingly the principal object of the present invention to provide an indicating mechanism for apprising the operator of the accounting machine of the group number of the cards next to control the adding and printing devices in which a simple, direct reading is obtained by a direct sensing of the cards.

In carrying out the object of the invention, the feeding mechanism of an accounting machine is modified, without interfering with its usual functions, by causing the differentially disposed holes in a plurality of card columns to be optically projected along a single line of a ground glass screen. Upon a group change the feeding mechanism is brought to rest and the first card of the next group will be positioned in front of a transparent sheet upon which are engraved numerals or other indicia located in areas corresponding to the value-representing positions on the card itself. The card will act as a mask permitting light to pass through the perforated areas, behind each of which is the engraved numeral representing the value of such perforation and through a suitable system of lenses the disclosed numerals are projected along a single line of the ground glass screen.

It is well known that accounting machines of the type to which the invention is applied, for example, such as shown in Patent 1,976,617, granted to Lake and Daly, may be adjusted, so that the cards are advanced singly, each in response to the operation of the start key. In such case, the invention has additional utility in enabling the machine to be employed as a verifying machine, that is, as each card is fed into the optical sensing position, the interpretation of its data is projected on the screen, enabling the operator to make a comparison with original records before pressing the start key to feed the next card and so on.

A further object of the invention resides in the provision of photographic recording mechanism for photographing the data contained in each record card passed through the machine. By means of the novel devices for projecting the interpreted data obtained from perforations distributed over the entire surface of the card, along a single line of a screen, the data so projected may be impressed photographically on a single line of a film. In this manner a truly condensed record is obtained which contains any or all of the data perforated in the record cards. Adjustable means is provided to vary the spacing of the photographed lines on the film.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

In the drawings:

Fig. 3 is a section at an enlarged scale taken on line 3—3 of Fig. 1.

Fig. 4 is a section taken on line 4—4 of Fig. 1.

Fig. 5 is a section taken on line 5—5 of Fig. 4.

Fig. 6 is a detail view of a section of film.

Figure 8:
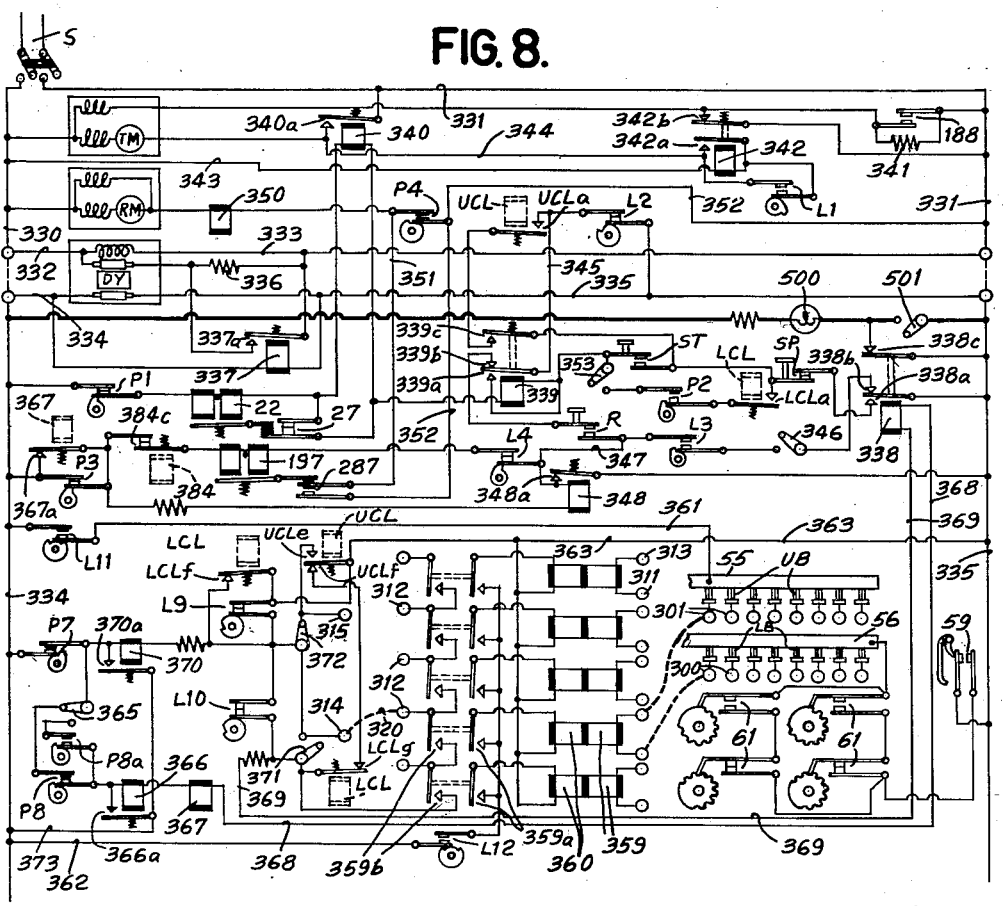
Fig. 8 is a wiring diagram of part of the electric circuits of the machine.
Figure 7:
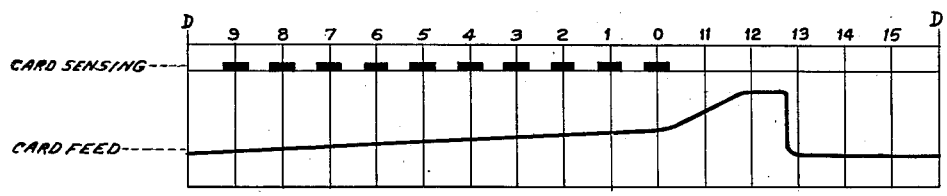
Fig. 7 is a timing chart showing the operation of the card feeding devices.

The accounting machine disclosed in the diagram of Fig. 8 is of the type disclosed in Patent 1,976,617 referred to and to which reference may be had for a complete description of its operation. The present description will be limited to what is necessary for an understanding of the present invention.

Referring to Fig. 8, there is shown the driving and automatic group control circuits substantially as shown in Fig. 29 of the patent with the added circuits emphasized by heavy lines. A preliminary reset cycle, following the closure of switch S, has established the so-called minor pick-up circuit, completed when cam contacts P7, P8 close and traceable from line 334, contacts P7, switch 365, contacts P8, minor control relay magnet 366, wire 369, cam contacts L10, L9, wire 368 to right side of line 335. Minor control relay 366 closes its contacts 366a to establish a holding circuit from line 334, contacts 366a, magnet 366 to line 335 as before. This circuit is called the minor holding circuit and remains energized as long as minor classification data on the record cards do not change.

During each cycle of the machine, cam contacts L10 and L9 open momentarily and since these contacts are in the minor holding circuit, the same would be interrupted at such time, if no other path were provided around the contacts. During tabulating and listing cycles of the machine, the contacts 359b provide a shunt circuit around contacts L10 and L9. For example, the two lowermost contacts 359b when both are closed and when plug connection 328 is made, as shown, short circuits contacts L10, the short circuit running from the lower blade of contacts L10, to the lowermost contacts 359b, then to the upper pair, plug connection 328, socket 314, to the upper blade of contacts L10.

Each pair of contacts 359b is controlled by a magnet 359 which is plug connected in series between the upper brush UB and the corresponding lower brush LB of a card column. As set forth in greater detail in Patent 1,976,617, as long as cards having the same group number perforations pass the two sets of brushes, all connected magnets 359 will be energized at some point during the analysis of the pair of passing cards. The usual holding circuits are set up to keep contacts 359b closed to and through the period that contacts L10 open, so that if there is agreement, the minor holding circuit is maintained and if there is disagreement the circuit is broken when contacts L10 open.

The ultimate object of the group control mechanism is to maintain relay magnet 338 energized as long as cards are in agreement. As explained in the patent, when magnet 338 is energized a circuit is completed to supply current to motor TM and to the clutch magnet 22 which couples the card feeding mechanism to the motor so that cards are uninterruptedly advanced in succession. Upon a group change, the consequent deenergization of magnet 338 will interrupt this circuit and the machine will stop, or if "automatic reset" switch 346 is closed, the machine will automatically enter upon a total taking cycle of operations. Following this, the machine will stop but again if "automatic restart" switch 353 is closed, card feeding operations will automatically resume, relay magnet 338 having been again energized during the total taking operations.

In Fig. 8, reference characters have been applied to the various parts in duplication of the corresponding parts in the patent referred to in order to facilitate cross-reference.

For present purposes, relay magnet 338 is provided with an additional pair of contacts 338c which, when the magnet is deenergized, complete a circuit to a lamp 500. A switch 501 when closed will keep the lamp illuminated independently of relay magnet 338.

Figure 1:
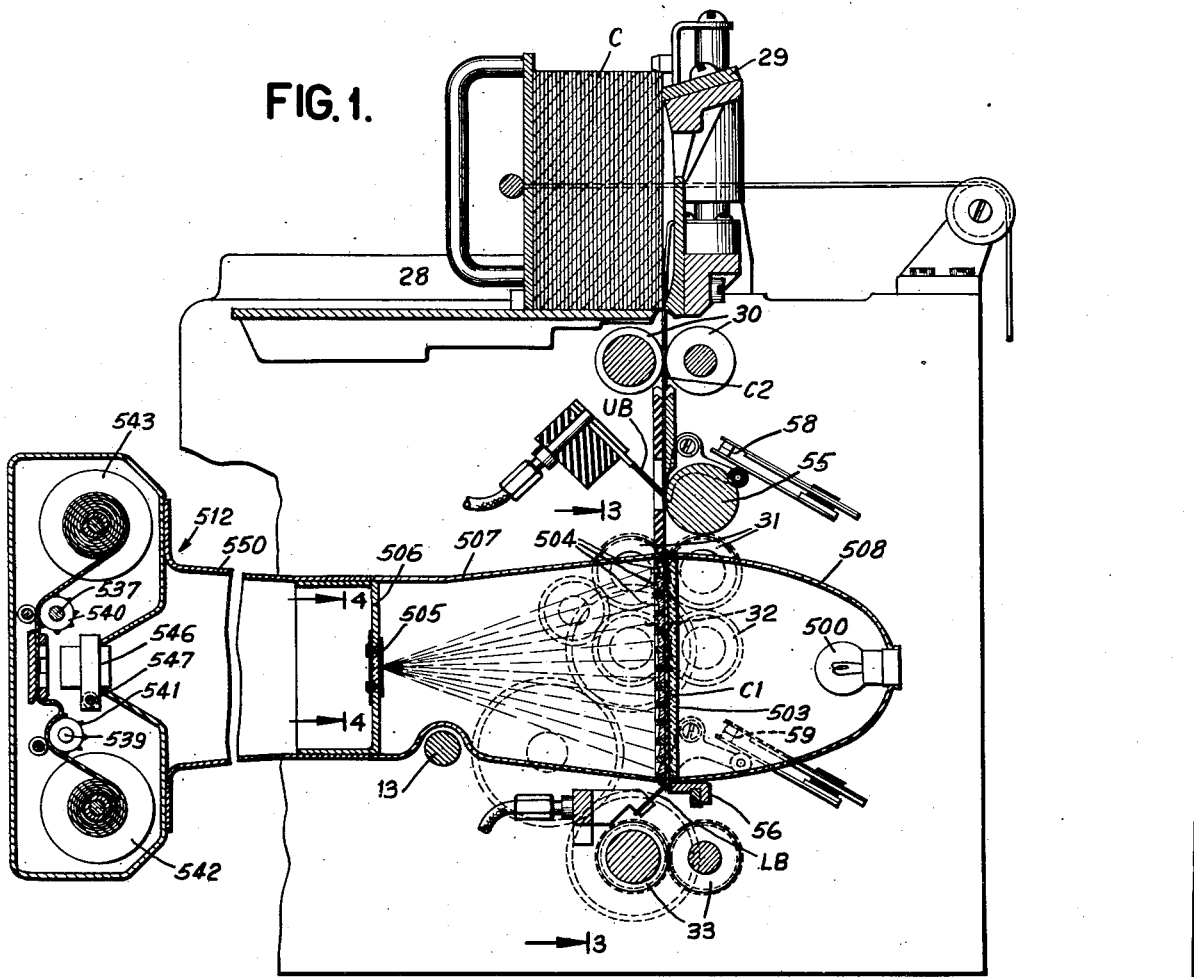
Fig. 1 is a central section through the card feeding mechanism showing the location of the optical projecting system.

Referring now to Fig. 1, record cards C are fed from magazine 28 by picker 29 to a pair of feed rollers 30 from which they are advanced to pairs of rollers 31, 32 and 33 to the discharge hopper (not shown). Between rollers 30 and 31 is the usual set of analyzing brushes UB and their cooperating contact roller 55 and also the card lever which closes contacts 58 while a card is passing brushes UB. Between rollers 32 and 33 are located the set of analyzing brushes LB whose construction is modified as shown to cooperate with a common contact bar 56. The usual card lever contacts 59 are also provided. The construction of brushes LB does not alter the point at which the cards are sensed thereby, and enables the location of the card interpreting devices in advance of these brushes.

It may be pointed out at this time that, upon a group change, the feeding mechanism is stopped with the cards occupying the relative positions shown in Fig. 1, that is, the card designated C1, which is the first card of a new group, has its leading edge under brushes LB, insulating the same from bar 56 and the second card C2 of the group occupies a corresponding position with respect to brushes UB. These also are the stopping positions when the machine is adjusted for manual initiation of each feed cycle. For this type of operation the group control magnets 359 are not plug connected so that no contacts 359b are closed. Consequently, when contacts L10 open, the holding circuit to magnet 338 is broken and the machine stops or takes a total according to the setting of switch 346. If switch 353 is left open, the next card feed cycle is manually initiated, the sequence of operations then being as follows: card feed, total taking, stop, card feed, total taking, stop, etc.

Referring now to Fig. 1, a transparent plate 503 (see also Fig. 3) is secured in position at one side of the card path. This plate has engraved or printed thereon opaque characters spaced to correspond to the index point positions of the record card so that, with a card in the position as at C1, perforations therein will unmask the underlying characters, revealing the numerical values of the holes. Thus, in Fig. 3 the account number 5012 and amount 2560 are revealed.

On the opposite side of the card path are positioned horizontally extending prismatic lenses 504, one in line with each horizontal row of index point positions, and at a distance from the lenses, on the same side of the card, is positioned a ground glass screen 505 secured in a hood 506. The space between the lenses and screen is encased in a light excluding casing 507. On the same side of the card path with plate 503 is a lamp 500 located at the focus of a parabolic reflector 508.

The angles of the prismatic lenses are so selected that light from the lamp 500 passing through plate 503 will project the image of the character in any horizontal row through the card perforation and lens 504 along a single line on the ground glass screen 505. Since, where numerical data are perforated in the card columns only a single perforation is made in any one column, it is apparent that but one of the characters in any vertical column will be projected on the screen, there will appear a single line of figures as in Fig. 4 representing the interpretation of the perforations in the card columns.

The interpretation is, of course, dependent upon the characters carried by plate 503 and these may be varied to suit various coding arrangements. For example, the holes may be made to represent a complement so that, if the plate is engraved with the true numbers in the complementary position, the interpretation of the holes will give an image on the screen of the true number.

In front of screen 505 are guide rails 510 along which shutters 511 are variably slidable to reveal any desired section of the screen and cover other sections.

Removably secured at the left of screen 505 is a camera mechanism generally designated 512 which may be removed so the screen is open to visual inspection by the machine operator and it will be appreciated that, whenever the card is at rest and lamp 500 is lighted, the image of the figures represented by the holes will be projected on screen 505. It follows, therefore, that with the machine adjusted to stop after each total taking cycle, lamp 500 is illuminated upon a group change so the operator can read the group number of the next card and select the next statement accordingly. If the machine is adjusted by opening switch 346 (Fig. 8) to stop upon the group change and before the total taking operation takes place, the indication will be visible until the operator initiates the total taking cycle manually, in which case it would be desirable to set the machine for automatic restarting of card feeding following the total taking operation.

With switch 501 (Fig. 8) closed, lamp 500 is constantly lighted and with the machine set for stopping after each card feed operation a visual inspection may be had of each card for comparison with original data to verify the correctness of the punchings in the cards.

The operation of the machine when the camera mechanism 512 is employed will now be explained. The marked utility of this arrangement may best be illustrated by pointing out that in the normal operation of a machine such as disclosed in the patent referred to, the preparation of a printed list containing a line of information for each card sensed involves the sensing of the perforations in each card as it passes brushes LB, the differential energization of printing magnets to position type carriers, to present to a printing line, characters representative of the holes sensed and all the necessary circuit connections and operating mechanism. In contradistinction to this involved manner of obtaining a printed list of card data, the invention contemplates the preparation of an equivalent listing of the separate card items by simple, direct interpretation of the holes in each card by projecting the same directly on the screen 505 and directly photographing the image of each card interpretation on a film or sensitized strip of light responsive material. Suitable spacing mechanism will cause the film to advance a selected increment for each card resulting in a list from which enlargements can be made and the original preserved as a permanent record of minimum bulk. The accuracy of such a method of listing will be readily apparent from the fact that only the figures behind perforations will be projected on the screen and the camera will truly record the image presented to it.

Figure 2:
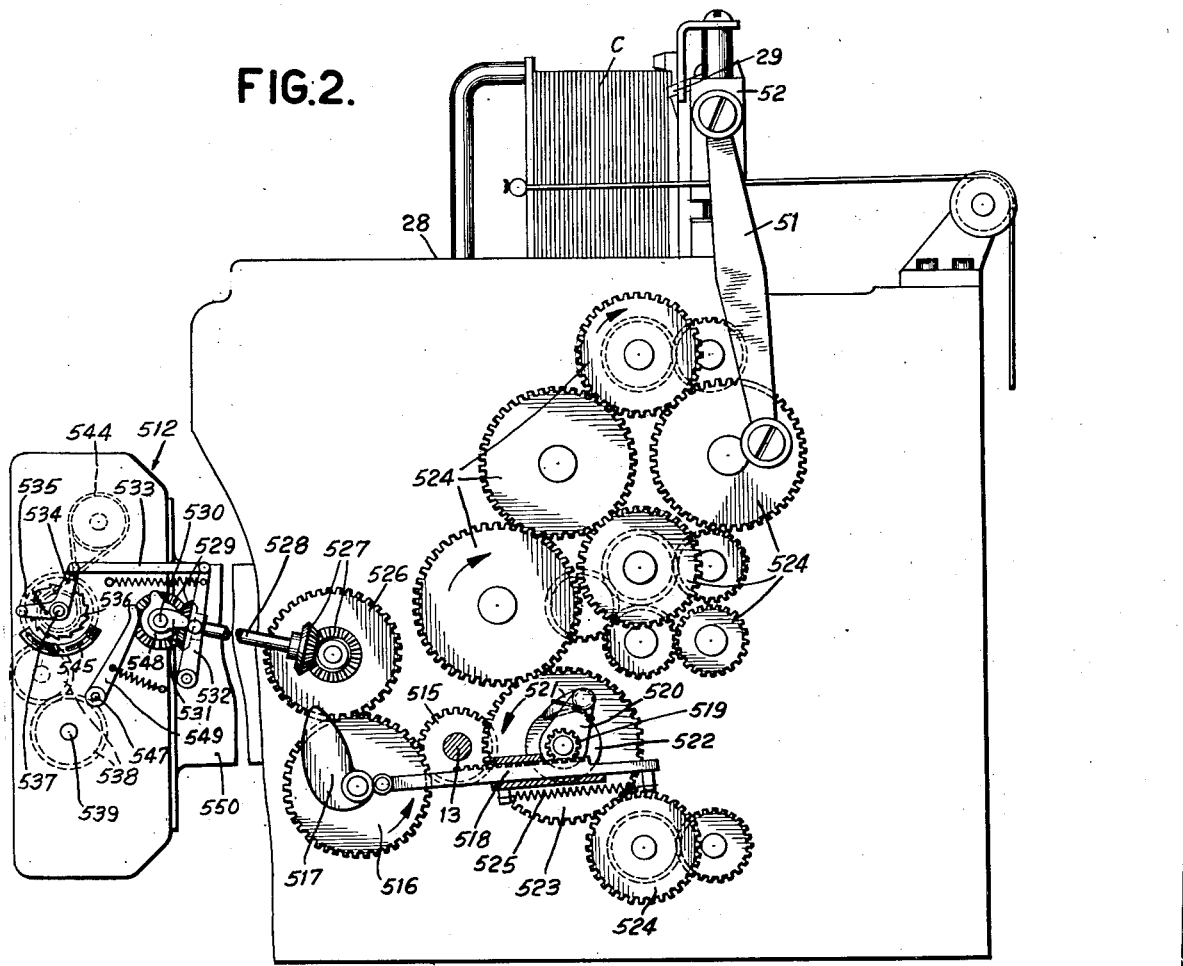
Fig. 2 is an outside view of the driving mechanism for the card feeding mechanism.

In order to insure adequate time for exposure of the film, the card feeding mechanism is modified as shown in Fig. 2, where 13 represents the similarly numbered drive shaft of Patent 1,976,617 and is provided with a gear 515 to drive a gear 516 which has secured thereto a cam 517 driven to make one revolution for each card passing through the machine. As cam 517 rotates, it urges a sliding rack 518 to the right to drive a pinion 519 secured to an arm 520 carrying a spring pressed pawl 521. The pawl engages a notch in disk 522 to drive the latter a full revolution during the advance stroke of rack 518. Secured to the disk 522 is a gear 523 which, through the gearing generally designated 524, drives the usual card feed rollers, and corresponds to gears 37, 36 of the patent.

The contour of cam 517 is such that the feed rollers advance the cards with a uniform motion to pass brushes UB and LB in the same time relation as in the patent. After the "0" positions have been sensed, the rollers are accelerated to bring the cards to the C1 and C2 positions where they stop, while the rack 518 returns to its start position under the influence of spring 525.

Gear 516 drives a gear 526 which through bevel pinions 527, shaft 528 and bevel pinions 529 drives a shaft 530 carried by the camera mechanism 512 and the gearing is such that shaft 530 makes one revolution for each card feeding operation. This rotation of shaft 530 is utilized for effecting and controlling the operations of the camera mechanism including film feeding and exposing.

The shaft 530 has secured to it a cam 531 which cooperates with a follower 532 whose free end is connected by a link 533 to a bell crank 534 carrying a spring pressed pawl 535 engageable with a ratchet 536. Ratchet 536 is fixed to sprocket shaft 537 and through gears 538 has connection with the other sprocket shaft 539 (see Fig. 1). The shafts 537 and 539 have the usual film feeding sprockets 540 and 541 to feed film from supply roll 542 to take-up roll 543, the spindle of the latter being driven from shaft 537 by slipping belt drive connection 544 (Fig. 2). The amount which ratchet 536 is advanced each cycle by pawl 535 is adjustably determined by a positionable stop 545 which limits the counterclockwise position of the pawl.

In Fig. 1 the part generally designated 546 is the shutter of the camera which may be of any desired type. The usual lens is in association with the shutter, and the shutter operating shaft is designated 547. Referring to Fig. 2 provision is made for rocking the shutter operating shaft 547 after the film is fed. It comprises a cam 548 on shaft 530 which is adapted to rock a spring restored lever 549 on shaft 547 and therethrough rock the shutter shaft and effect exposure of the film.

Movement of the entire camera mechanism to the left as viewed in Fig. 1 will slide its casing 550 off hood 506 which supports it, and gears 527 will disengage from one another.

The operation of the machine with the camera in place will now be explained. Cards are placed in the supply magazine, switch 501 is closed to light lamp 500, the automatic control switches 371 and 372 are closed to effect a permanent shunt around cams L9 and L10 so the group control mechanism is ineffective and cards will then feed in succession until the supply is exhausted. As each card reaches the interpreting position, it will come to rest and the figures behind perforated positions will be projected on screen 506. While the card is at rest, a section of film is advanced and the shutter tripped to record the image silhouetted on the screen.

It will be appreciated that with the employment of a so-called "fast" film that by proper synchronization of the time of exposure of the film with the exact instant that the card is in the CI position, it is not necessary to stop the card and a record may be made of the interpretation "in flight."

In Fig. 6 is shown a specimen of a film on which data is recorded from several cards.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine arranged for control by record cards having columns of index point positions, each column containing a plurality of differentially located positions and each position in a column representing a different character, a perforation in any selected position designating the related character for that column, a transparent plate having index point positions arranged to correspond to the positions on the card and each position having an opaque character marked therein representing the character of the related card position, means for feeding a record card into position to superimpose its index point positions upon the corresponding positions of the plate, whereby any perforation will directly reveal therethrough the correspondingly located character, a translucent screen, a system of lenses interposed between said screen and plate to direct light from each position in a column to a single point on the screen, the single points for all columns falling on a single line of the screen, and a light source to project an image of the characters on the plate, that are unmasked by card perforations, through said system of lenses, to record on said screen and on a single line the interpretation of the differentially located perforations on the card.

2. In a machine arranged for control by record cards having columns of index point positions, each column containing a plurality of differentially located positions and each position in a column representing a different character, a perforation in any selected position designating the related character for that column a plurality of opaque characters arranged and supported in positions corresponding to the arrangement of the index point positions on the card, a translucent screen, a light source, a lens system for projecting an image of all the opaque characters in each column along a single line on said screen, there being a separate plane of projection for each column of characters, and means for feeding a record card into superposition with respect to said opaque characters to directly select for projection through the perforations themselves only characters corresponding to positions in which the card is perforated whereby there will be projected on a single line on said screen an image of each character selected by the perforations.

3. In a machine arranged for control by record cards having columns of index point positions, each column containing a plurality of differentially located positions and each position in a column representing a different character, a perforation in any selected position designating the related character for that column, the combination of an arrangement of opaque characters spaced in a single plane to correspond to the spacing of the index point positions of the record card, means to position a record card adjacent to said plane of opaque characters whereby characters in positions corresponding to perforated positions in the card are discernible through such perforations, a screen, a light source and an optical system arranged to project the said discernible characters along a single line on said screen.

4. The invention set forth in claim 3 in which means is provided to successively position each of a series of cards adjacent to said plane of opaque characters, to successively project an image of the interpreted perforations on said screen, and in which further means is provided for recording, on successive lines of a record strip, the successive lines of characters representing the card perforations.

5. The invention set forth in claim 3 in which means is provided to successively position each of a series of cards adjacent to said plane of opaque characters, to successively project an image of the interpreted perforations on said screen and in which a camera is provided whose operating mechanism is synchronized with said card positioning means to expose successive sections of a film to said screen whereby each image is recorded on said film and in successive sections thereof.

6. The invention set forth in claim 3 in which means is provided to successively position each of a series of cards adjacent to said plane of opaque characters, to successively project an image of the interpreted perforations on said screen and in which a camera is provided whose operating mechanism is synchronized with said card positioning means to expose successive sections of a film to said screen whereby each image is recorded on said film and in successive sections thereof, and means for adjusting the operating mechanism of the camera so the images will be recorded on successive lines of variable selectable spacing.

CLARENCE C. SMITH.